US012784193B2

(12) United States Patent
Takei

(10) Patent No.: US 12,784,193 B2
(45) Date of Patent: Nov. 3, 2026

(54) IMAGE PROCESSING APPARATUS, IMAGE PROCESSING METHOD, AND IMAGE PROCESSING PROGRAM FOR ACCURATE DIAGNOSIS OF TARGET ORGAN

(71) Applicant: FUJIFILM Corporation, Tokyo (JP)

(72) Inventor: Mizuki Takei, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 685 days.

(21) Appl. No.: 18/336,928

(22) Filed: Jun. 16, 2023

(65) Prior Publication Data

US 2024/0037738 A1 Feb. 1, 2024

(30) Foreign Application Priority Data

Jul. 29, 2022 (JP) ................................ 2022-121978

(51) Int. Cl.
*G06T 7/00* (2017.01)
*G06V 10/25* (2022.01)

(52) U.S. Cl.
CPC ............ *G06T 7/0012* (2013.01); *G06V 10/25* (2022.01); *G06V 2201/031* (2022.01)

(58) Field of Classification Search
CPC . G06T 7/0012; G06V 10/25; G06V 2201/031
See application file for complete search history.

(56) References Cited

U.S. PATENT DOCUMENTS

2016/0239969 A1* 8/2016 Davatzikos ........... G06T 7/0016
2021/0219941 A1* 7/2021 Tsutaoka ................... G06T 7/73
2024/0095918 A1* 3/2024 Ogasawara ........... G06T 7/0012
2024/0112786 A1* 4/2024 Ogasawara .............. A61B 6/03

FOREIGN PATENT DOCUMENTS

JP 2009219610 10/2009

OTHER PUBLICATIONS

Jake St. Peter's post, Facebook (Year: 2016).*

* cited by examiner

*Primary Examiner* — Barbara D Reinier
(74) *Attorney, Agent, or Firm* — JCIPRNET

(57) ABSTRACT

A processor extracts a region of a target organ from a medical image, extracts a region of at least one peripheral organ that is present in a periphery of the target organ from the medical image, derives a positional relationship between the target organ and the peripheral organ, and determines whether or not the target organ is compressed by the peripheral organ based on the positional relationship.

3 Claims, 8 Drawing Sheets

IMAGE PROCESSING APPARATUS, IMAGE PROCESSING METHOD, AND IMAGE PROCESSING PROGRAM FOR ACCURATE DIAGNOSIS OF TARGET ORGAN

CROSS REFERENCE TO RELATED APPLICATIONS

The present application claims priority from Japanese Patent Application No. 2022-121978, filed on Jul. 29, 2022, the entire disclosure of which is incorporated herein by reference.

BACKGROUND

Technical Filed

The present disclosure relates to an image processing apparatus, an image processing method, and an image processing program.

Related Art

In recent years, with the progress of medical devices, such as a computed tomography (CT) apparatus and a magnetic resonance imaging (MRI) apparatus, it is possible to make an image diagnosis by using a medical image having a higher quality and a higher resolution. In addition, computer-aided diagnosis (CAD), in which the presence probability, positional information, and the like of a lesion are derived by analyzing the medical image and presented to a doctor, such as an image interpretation doctor, is put into practical use. For example, JP2009-219610A proposes a method of specifying a region of a target organ and extracting a region suspected to be abnormal based on diagnostic criteria determined for each organ.

By the way, in order to make the diagnosis of the target organ by using the CAD, it is important to specify a change in a shape of the target organ, such as atrophy or swelling of the target organ. For example, in a case in which the target organ is the pancreas, in a case in which a tumor of the pancreas develops, the pancreatic parenchyma in the periphery of the tumor swells or the pancreatic parenchyma other than the tumor undergoes the atrophy. For this reason, it is important to focus on a size of a diameter of the pancreas included in the medical image to make the diagnosis of a state of a pancreatic disease.

Here, the pancreas is surrounded by other organs, such as a stomach and a liver. Therefore, in some cases, the diameter of the pancreas is apparently decreased due to the compression from other organs. In this case, since the medical image includes an image of the pancreas of which a part is thinned, it is determined that the pancreas has atrophy, and as a result, there is a possibility that it is determined that there is an abnormality even though there is no pancreatic disease.

SUMMARY OF THE INVENTION

The present disclosure has been made in view of the above circumstances, and is to enable an accurate diagnosis of a target organ.

A first aspect of the present disclosure relates to an image processing apparatus comprising at least one processor, in which the processor extracts a region of a target organ from a medical image, extracts a region of at least one peripheral organ that is present in a periphery of the target organ from the medical image, derives a positional relationship between the target organ and the peripheral organ, and determines whether or not the target organ is compressed by the peripheral organ based on the positional relationship.

A second aspect of the present disclosure relates to the image processing apparatus according to the first aspect, in which the processor may further determine presence or absence of atrophy of the target organ.

A third aspect of the present disclosure relates to the image processing apparatus according to the second aspect, in which the processor may determine whether or not the target organ is compressed by the peripheral organ in a case in which it is determined that the target organ has the atrophy.

A fourth aspect of the present disclosure relates to the image processing apparatus according to the third aspect, in which the processor may determine that the target organ has no abnormality in a case in which it is determined that the target organ has no atrophy, may determine that the target organ has no abnormality in a case in which the target organ has the atrophy and the target organ is compressed by the peripheral organ, and may determine that the target organ has the abnormality in a case in which the target organ has the atrophy and the target organ is not compressed by the peripheral organ.

A fifth aspect of the present disclosure relates to the image processing apparatus according to any one of the first to fourth aspects, in which the processor may determine whether or not the target organ is compressed by the peripheral organ based also on the medical image in addition to the positional relationship.

The present disclosure relates to an image processing method comprising extracting a region of a target organ from a medical image, extracting a region of at least one peripheral organ that is present in a periphery of the target organ from the medical image, deriving a positional relationship between the target organ and the peripheral organ, and determining whether or not the target organ is compressed by the peripheral organ based on the positional relationship.

The present disclosure relates to an image processing program causing a computer to execute a procedure of extracting a region of a target organ from a medical image, a procedure of extracting a region of at least one peripheral organ that is present in a periphery of the target organ from the medical image, a procedure of deriving a positional relationship between the target organ and the peripheral organ, and a procedure of determining whether or not the target organ is compressed by the peripheral organ based on the positional relationship.

According to the present disclosure, it is possible to make the accurate diagnosis of the target organ.

DETAILED DESCRIPTION

Figure 1:
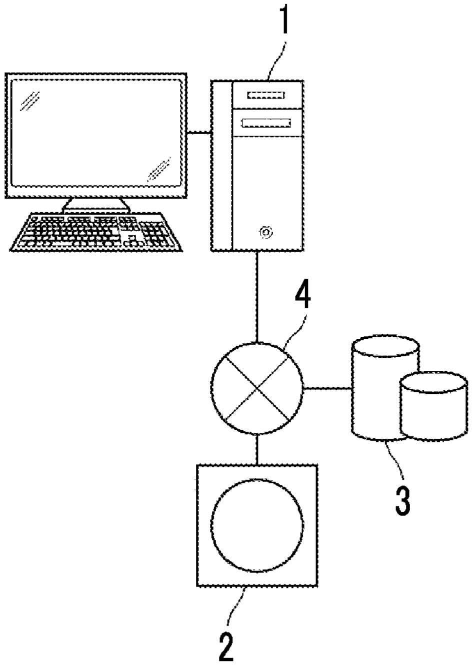
FIG. 1 is a diagram showing a schematic configuration of a diagnosis support system to which an image processing apparatus according to a first embodiment of the present disclosure is applied.

Hereinafter, an embodiment of the present disclosure will be described with reference to the drawings. First, a configuration of a medical information system to which an image processing apparatus according to the present embodiment is applied will be described. FIG. 1 is a diagram showing a schematic configuration of the medical information system. In the medical information system shown in FIG. 1, a computer 1 including the image processing apparatus according to the present embodiment, an imaging apparatus 2, and an image storage server 3 are connected via a network 4 in a communicable state.

The computer 1 includes the image processing apparatus according to the present embodiment, and an image processing program according to the present embodiment is installed in the computer 1. The computer 1 may be a workstation or a personal computer directly operated by a doctor who makes a diagnosis, or may be a server computer connected to the workstation or the personal computer via the network. The image processing program is stored in a storage device of the server computer connected to the network or in a network storage to be accessible from the outside, and is downloaded and installed in the computer 1 used by the doctor, in response to a request. Alternatively, the image processing program is distributed in a state of being recorded on a recording medium, such as a digital versatile disc (DVD) or a compact disc read only memory (CD-ROM), and is installed in the computer 1 from the recording medium.

The imaging apparatus 2 is an apparatus that images a diagnosis target part of a subject to generate a three-dimensional image showing the part and is, specifically, a CT apparatus, an MRI apparatus, a positron emission tomography (PET) apparatus, and the like. The three-dimensional image consisting of a plurality of tomographic images generated by the imaging apparatus 2 is transmitted to and stored in the image storage server 3. It should be noted that, in the present embodiment, the imaging apparatus 2 is a CT apparatus, and a CT image of an abdomen of the subject is generated as the three-dimensional image. It should be noted that the acquired CT image may be a contrast CT image or a non-contrast CT image.

The image storage server 3 is a computer that stores and manages various data, and comprises a large-capacity external storage device and database management software. The image storage server 3 communicates with another device via the wired or wireless network 4, and transmits and receives image data and the like to and from the other device. Specifically, the image storage server 3 acquires various data including the image data of the CT image generated by the imaging apparatus 2 via the network, and stores and manages the various data in the recording medium, such as the large-capacity external storage device. It should be noted that the storage format of the image data and the communication between the devices via the network 4 are based on a protocol, such as digital imaging and communication in medicine (DICOM).

Figure 2:
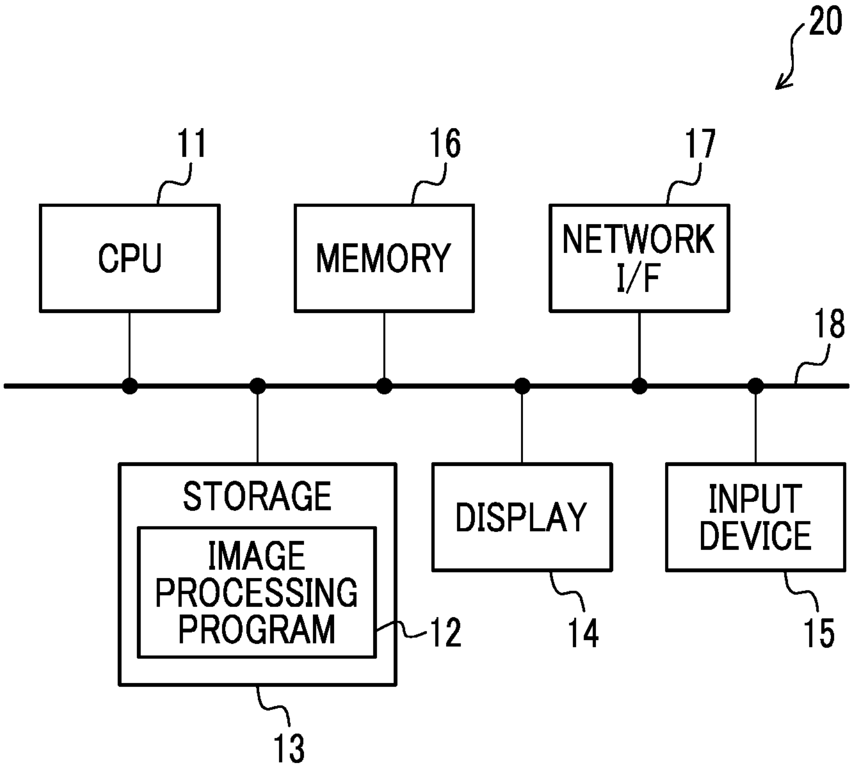
FIG. 2 is a diagram showing a hardware configuration of the image processing apparatus according to the first embodiment.

Next, the image processing apparatus according to the first embodiment will be described. FIG. 2 is a diagram showing a hardware configuration of the image processing apparatus according to the first embodiment. As shown in FIG. 2, the image processing apparatus 20 includes a central processing unit (CPU) 11, a non-volatile storage 13, and a memory 16 as a transitory storage region. Moreover, the image processing apparatus 20 includes a display 14, such as a liquid crystal display, an input device 15, such as a keyboard and a mouse, and a network interface (I/F) 17 connected to the network 4. The CPU 11, the storage 13, the display 14, the input device 15, the memory 16, and the network I/F 17 are connected to a bus 18. It should be noted that the CPU 11 is an example of a processor according to the present disclosure.

The storage 13 is realized by a hard disk drive (HDD), a solid state drive (SSD), a flash memory, and the like. An image processing program 12 is stored in the storage 13 as a storage medium. The CPU 11 reads out the image processing program 12 from the storage 13, develops the image processing program 12 in the memory 16, and executes the developed image processing program 12.

Figure 3:
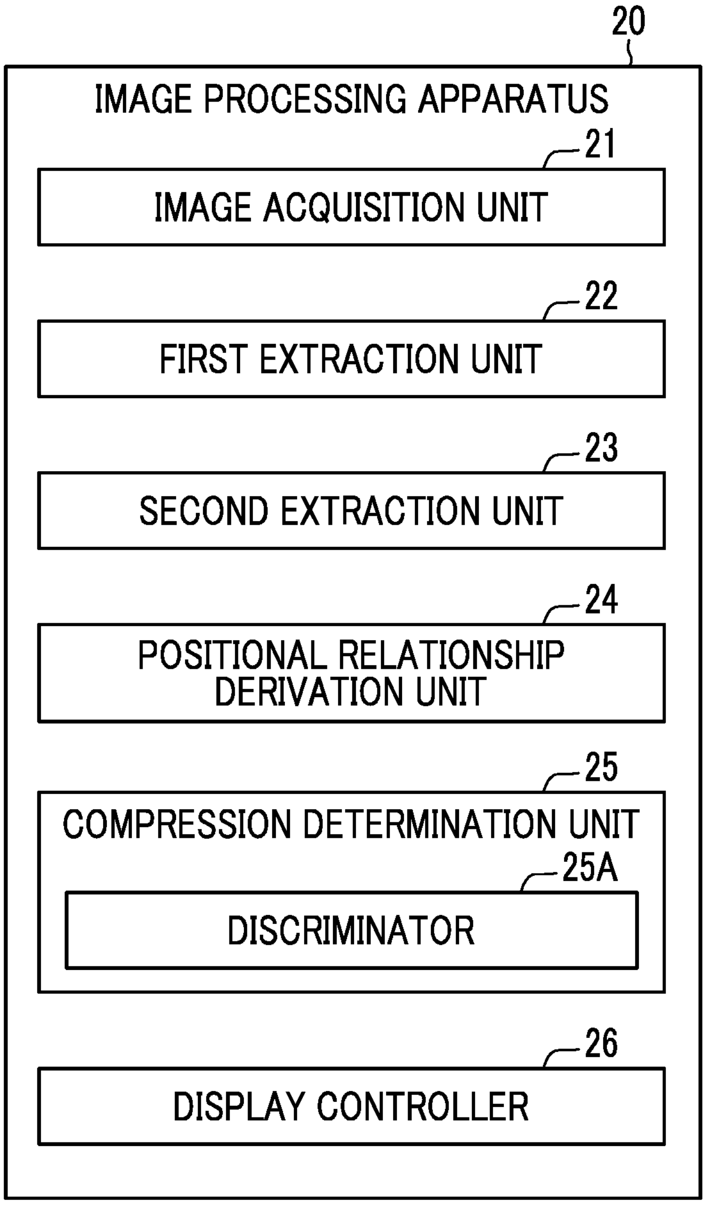
FIG. 3 is a functional configuration diagram of the image processing apparatus according to the first embodiment.

Hereinafter, a functional configuration of the image processing apparatus according to the first embodiment will be described. FIG. 3 is a diagram showing the functional configuration of the image processing apparatus according to the first embodiment. As shown in FIG. 3, the image processing apparatus 20 comprises an image acquisition unit 21, a first extraction unit 22, a second extraction unit 23, a positional relationship derivation unit 24, a compression determination unit 25, and a display controller 26. By executing the image processing program 12 by the CPU 11, the CPU 11 functions as the image acquisition unit 21, the first extraction unit 22, the second extraction unit 23, the positional relationship derivation unit 24, the compression determination unit 25, and the display controller 26.

The image acquisition unit 21 acquires a medical image G0 that is a processing target from the image storage server 3 in response to an instruction from the input device 15 by an operator. In the present embodiment, the medical image G0 is the CT image including the plurality of tomographic images including the abdomen of the human body.

The first extraction unit 22 extracts a region of a target organ from the medical image G0. In the present embodiment, the target organ is a pancreas. Therefore, the first extraction unit 22 includes a semantic segmentation model (hereinafter, referred to as a SS model) subjected to machine learning to extract the pancreas from the medical image G0. As is well known, the SS model is a machine learning model that outputs an output image in which a label representing an extraction target (class) is assigned to each pixel of the input image. In the present embodiment, the input image is a tomographic image constituting the medical image G0, the extraction target is the pancreas, and the output image is an image in which a region of the pancreas is labeled. The SS model is constructed by a convolutional neural network (CNN), such as residual networks (ResNet) or U-shaped networks (U-Net).

Figure 4:
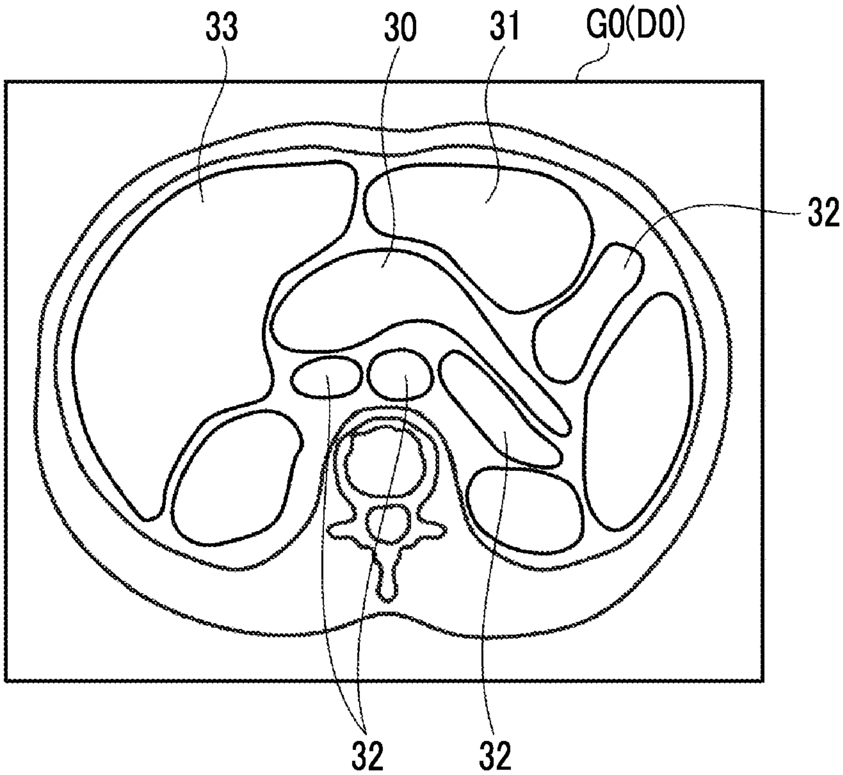
FIG. 4 is a diagram describing extraction of regions of a pancreas and a peripheral organ of the pancreas.

As a result, the first extraction unit 22 extracts a region of a pancreas 30 included in the medical image G0 shown in FIG. 4.

The extraction of the target organ is not limited to the extraction using the SS model. Any method of extracting the target organ from the medical image G0, such as template matching or threshold value processing for a CT value, can be applied.

The second extraction unit 23 extracts a region of at least one peripheral organ in the periphery of the target organ. In the present embodiment, since the target organ is the pancreas, the second extraction unit 23 extracts a stomach, a duodenum, a liver, a blood vessel, and the like in the periphery of the pancreas. In the present embodiment, the second extraction unit 23 extracts the stomach, the duodenum, and the liver as the peripheral organs. Therefore, the second extraction unit 23 includes the SS model subjected to machine learning to extract each of the stomach, the duodenum, and the liver from the medical image G0. In the SS model of the second extraction unit 23, the input image is the tomographic image constituting the medical image G0, the extraction targets are the stomach, the duodenum, and the liver, and the output image is an image in which regions of the stomach, the duodenum, and the liver are labeled.

As a result, the second extraction unit 23 extracts the regions of a stomach 31, a duodenum 32, and a liver 33 included in the medical image G0 shown in FIG. 4.

The extraction of the regions of the peripheral organs is not limited to the extraction using the SS model. Any method of extracting the regions of the peripheral organs from the medical image G0, such as template matching or threshold value processing for a CT value, can be applied.

The positional relationship derivation unit 24 derives a positional relationship between the target organ and the peripheral organs. Specifically, the positional relationship derivation unit 24 derives the shortest distance between the pancreas 30 and each of the stomach 31, the duodenum 32, and the liver 33 as the positional relationship. In order to derive the positional relationship, the positional relationship derivation unit 24 extracts a contour line of each of the pancreas 30, the stomach 31, the duodenum 32, and the liver 33. Then, the positional relationship derivation unit 24 derives the shortest distance between the contour line of the pancreas 30 and each of the contour line of the stomach 31, the contour line of the duodenum 32, and the contour line of the liver 33 as the positional relationship. It should be noted that, in a case in which the contour lines are in contact with each other, the shortest distance is zero.

Figure 5:
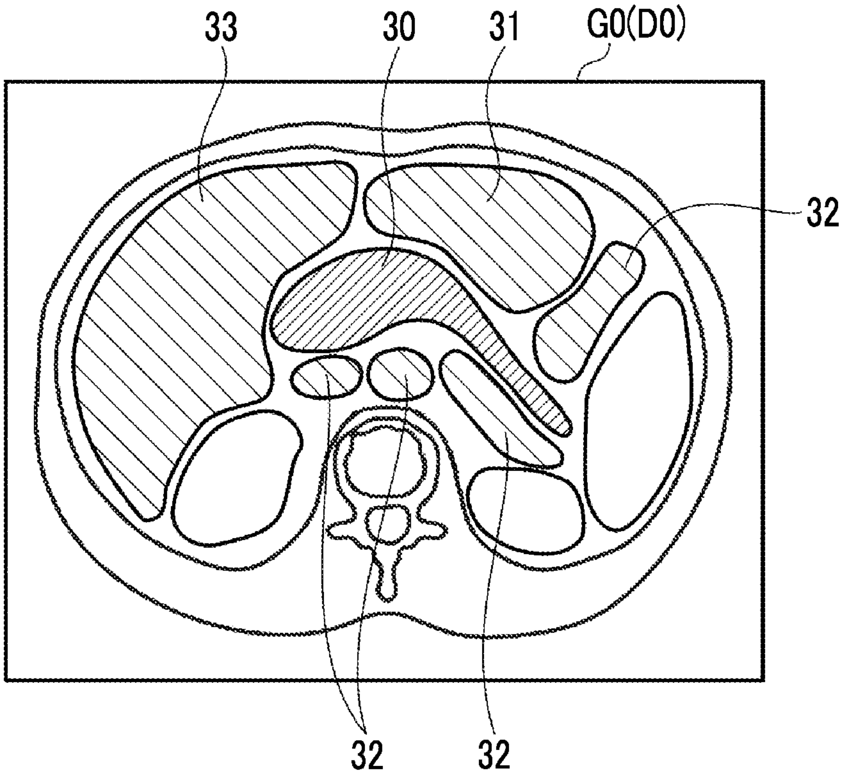
FIG. 5 is a diagram showing an image in which different masks are assigned to the pancreas and the peripheral organ, respectively.

It should be noted that the positional relationship derivation unit 24 may derive the regions of the pancreas 30, the stomach 31, the duodenum 32, and the liver 33 included in the medical image G0 as the positional relationship. As shown in FIG. 5, the region itself is an image in which different masks are assigned to the pancreas 30 and the peripheral organs. It should be noted that, in FIG. 5, the same mask is assigned to the stomach 31, the duodenum 32, and the liver 33, as the peripheral organs.

The compression determination unit 25 determines whether or not the target organ, that is, the pancreas 30 is compressed by the peripheral organs based on the positional relationship derived by the positional relationship derivation unit 24. Therefore, the compression determination unit 25 includes a discriminator 25A that outputs an evaluation value representing whether or not the pancreas 30 is compressed by the peripheral organs based on the positional relationship.

The discriminator 25A is constructed by performing machine learning on a convolutional neural network using a plurality of teacher data in which the positional relationship and the presence or absence of the compression of the pancreas 30 are known. It should be noted that, in a case in which the positional relationship is the shortest distance between the pancreas 30 and each of the stomach 31, the duodenum 32, and the liver 33, the teacher data in which the shortest distance and the presence or absence of the compression are known is used for the training of the discriminator 25A. In a case in which the positional relationship is the region itself, the teacher data in which each of the pancreas 30 and the peripheral organs (that is, the stomach 31, the duodenum 32, and the liver 33) is masked, and the presence or absence of the compression is known is used for the training of the discriminator 25A.

The evaluation value representing the presence or absence of the compression of the pancreas, which is output by the discriminator 25A, is a probability representing that the pancreas is compressed, and is a value that is equal to or more than 0 and equal to or less than 1.

Figure 6:
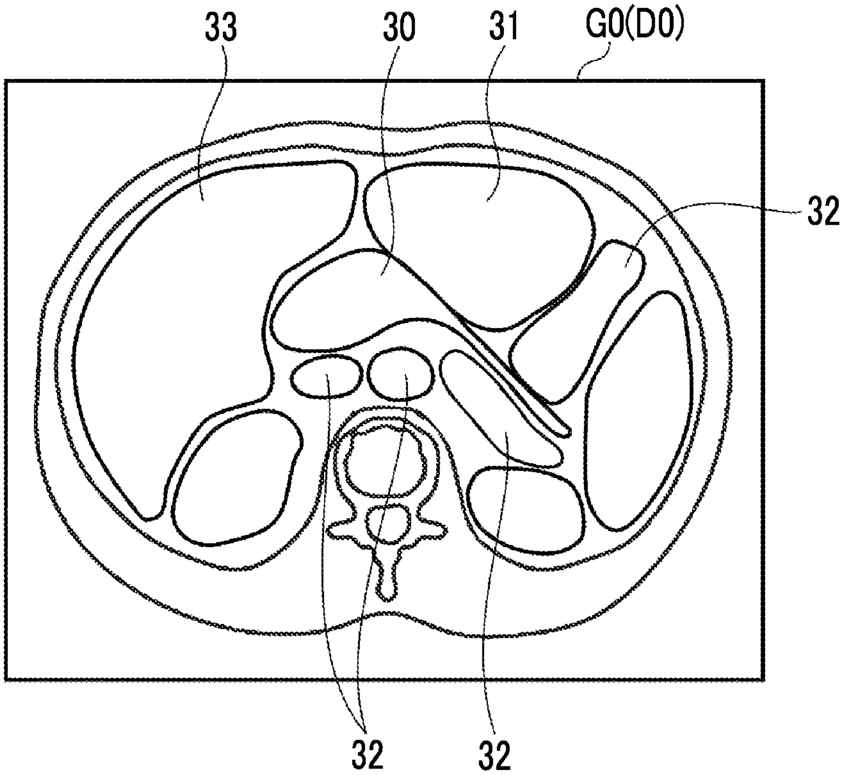
FIG. 6 is a diagram showing a medical image including the pancreas in which a caudal portion is compressed.

The compression determination unit 25 determines that the pancreas is compressed in a case in which the evaluation value output by the discriminator 25A is equal to or more than a predetermined threshold value. Here, in the medical image G0 shown in FIGS. 4 and 5, since the pancreas 30 is not in contact with the peripheral organs, the evaluation value output by the discriminator 25A is less than the threshold value, and thus the compression determination unit 25 determines that there is no compression of the pancreas 30. On the other hand, as shown in FIG. 6, since a caudal portion of the pancreas 30 is in contact with the peripheral organs (in FIG. 6, a part of the stomach 31 and the duodenum 32), the evaluation value output by the discriminator 25A is equal to or more than the threshold value, and thus the compression determination unit 25 determines that there is the compression in the pancreas 30.

Figure 7:
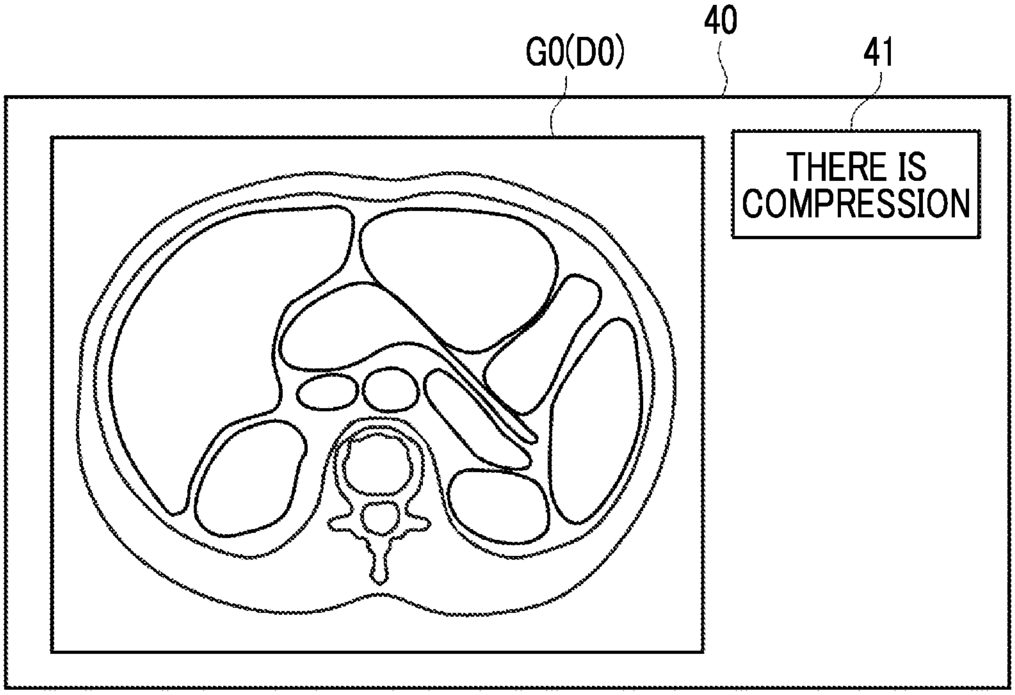
FIG. 7 is a diagram showing a display screen of a determination result of the presence or absence of compression (there is compression).

The display controller 26 displays a determination result of the presence or absence of the compression of the pancreas 30 on the display 14. FIG. 7 is a diagram showing a display screen of the determination result. As shown in FIG. 7, the medical image G0 in a case in which it is determined that there is the compression is displayed on a display screen 40. In addition, a determination result 41 indicating there is the compression is also displayed.

Figure 8:
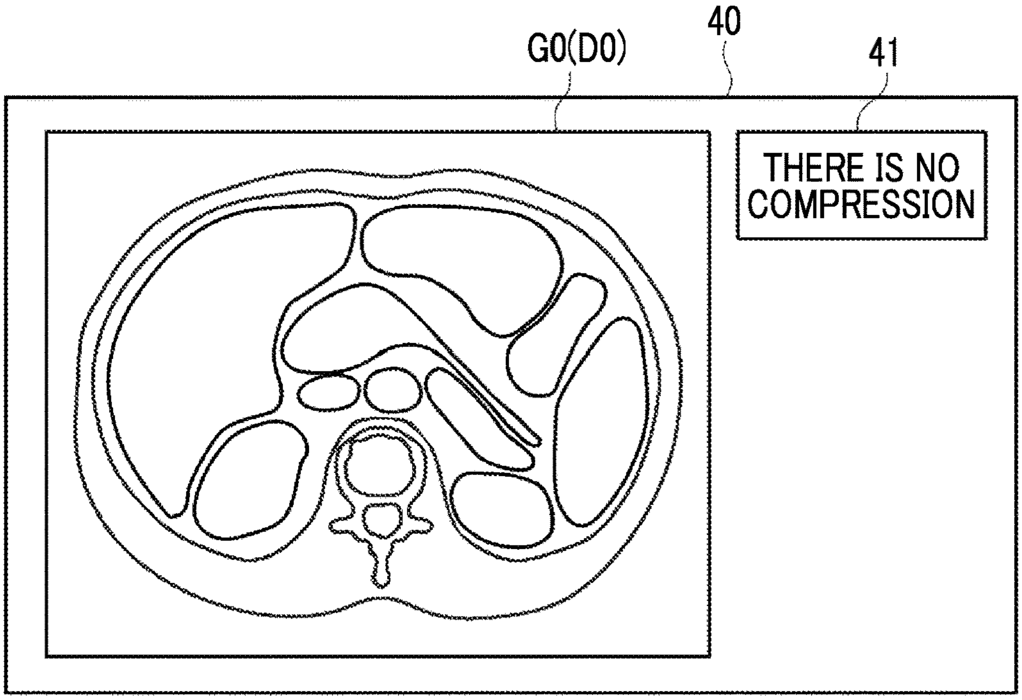
FIG. 8 is a diagram showing a display screen of a determination result of the presence or absence of compression (there is no compression).

It should be noted that, in a case in which the pancreas 30 is not compressed, the compression determination unit 25 determines that there is no compression of the pancreas 30. FIG. 8 is a diagram showing a display screen of a determination result in a case in which there is no compression. As shown in FIG. 8, the medical image G0 in a case in which it is determined that there is no compression is displayed on the display screen 40. In addition, a determination result 41 indicating there is no compression is also displayed. However, as shown in FIG. 8, the caudal portion of the pancreas 30 undergoes the atrophy. In this case, the doctor can determine that the pancreas 30 has an abnormality based on the determination result.

Figure 9:
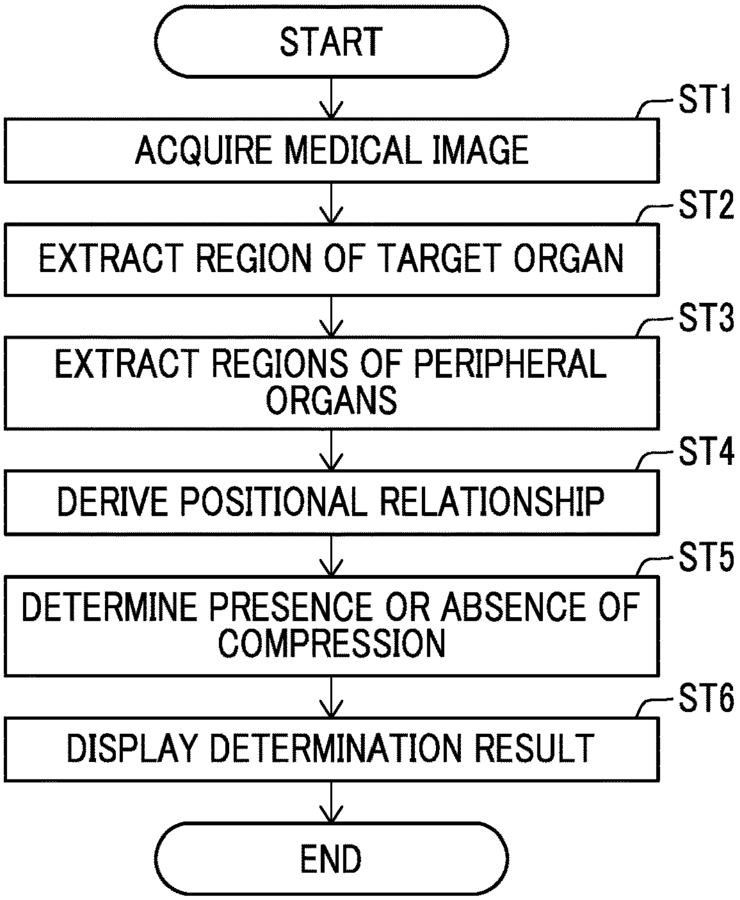
FIG. 9 is a flowchart showing processing performed in the first embodiment.

Hereinafter, processing performed in the first embodiment will be described. FIG. 9 is a flowchart showing the processing performed in the first embodiment. First, the image acquisition unit 21 acquires the medical image G0 from the storage 13 (step ST1), and the first extraction unit 22 extracts the region of the target organ from the medical image G0

(step ST2). Next, the second extraction unit 23 extracts the region of at least one peripheral organ in the periphery of the target organ (step ST3), and the positional relationship derivation unit 24 derives the positional relationship between the target organ and the peripheral organs (step ST4). Next, the compression determination unit 25 determines whether or not the target organ, that is, the pancreas 30 is compressed by the peripheral organs based on the positional relationship derived by the positional relationship derivation unit 24 (step ST5). Then, the display controller 26 displays the determination result of the presence or absence of the compression of the pancreas 30 on the display 14 (step ST6), and terminates the processing.

As described above, in the present embodiment, whether or not the target organ, that is, the pancreas 30 is compressed by the peripheral organs is determined based on the positional relationship between the target organ and the peripheral organs. Therefore, an accurate diagnosis of the target organ can be made by referring to the determination result.

Figure 10:
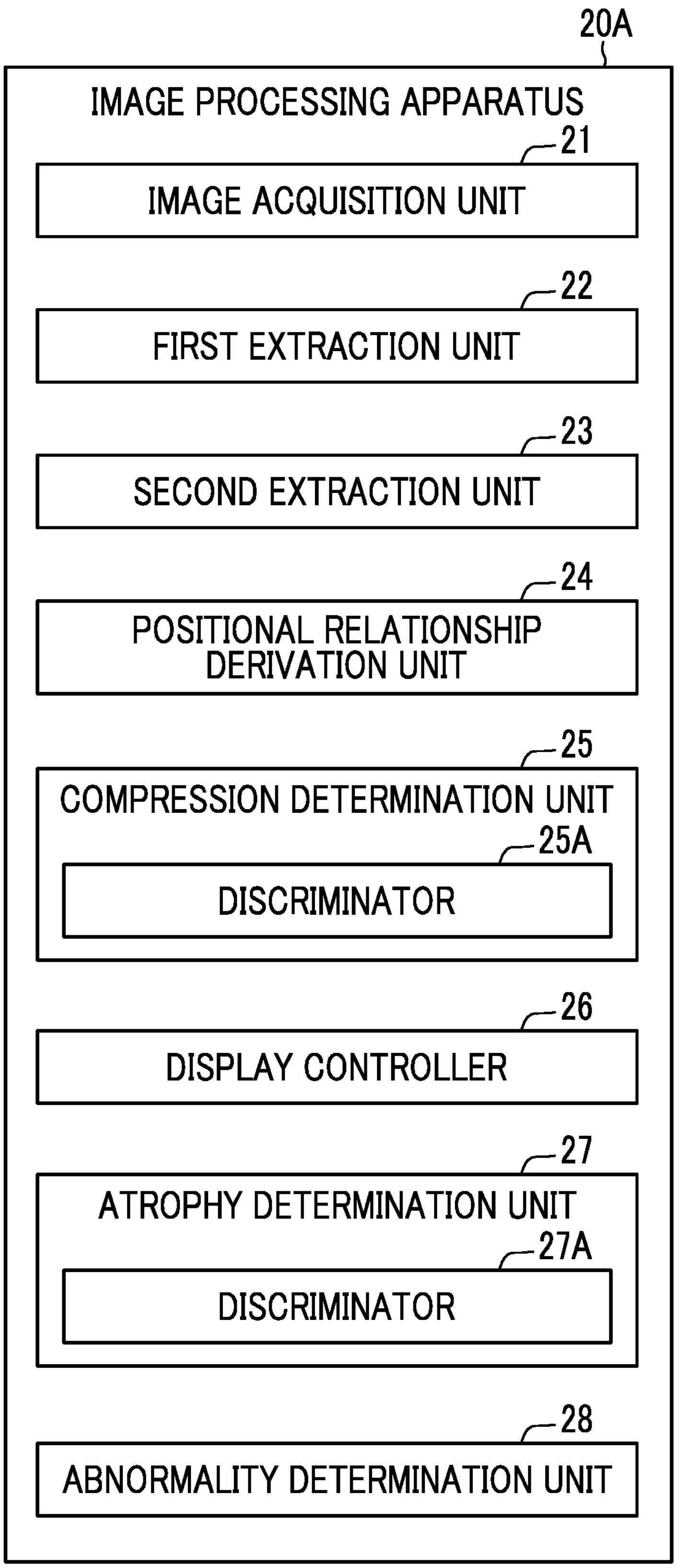
FIG. 10 is a functional configuration diagram of an image processing apparatus according to a second embodiment.

Hereinafter, a second embodiment of the present disclosure will be described. FIG. 10 is a diagram showing a functional configuration of an image processing apparatus according to the second embodiment. It should be noted that, in FIG. 10, the same reference numerals are assigned to the same configurations as those in FIG. 3, and the detailed description thereof will be omitted. An image processing apparatus 20A according to the second embodiment is different from the first embodiment in that an atrophy determination unit 27 and an abnormality determination unit 28 are further provided.

The atrophy determination unit 27 derives a feature of the pancreas extracted by the first extraction unit 22, and determines the presence or absence of the atrophy of the target organ (that is, the pancreas) based on the derived feature. Therefore, the atrophy determination unit 27 includes a discriminator 27A that outputs an evaluation value representing the presence or absence of the atrophy of the pancreas based on the feature of the pancreas. The discriminator 27A is constructed by performing machine learning on a convolutional neural network using a plurality of teacher data in which the presence or absence of the atrophy of the pancreas is known. The evaluation value representing the presence or absence of the atrophy of the pancreas, which is output by the discriminator 27A, is a probability representing that the pancreas undergoes the atrophy, and is a value that is equal to or more than 0 and equal to or less than 1.

Examples of the feature of the pancreas include at least one of a diameter, a size, or a texture of the pancreas. As the diameter of the pancreas, a diameter in a cross section intersecting a major axis of the pancreas can be used. It should be noted that, since the diameters of the pancreas are different at each position along the major axis of the pancreas, a plurality of cross sections intersecting the major axis need only be set at predetermined intervals along the major axis of the pancreas, and a representative value (for example, a maximum value, a minimum value, a median value, and an average value) of the diameters in the plurality of cross sections need only be used as the diameter of the pancreas. In addition, since the cross section intersecting the major axis of the pancreas is not a circle, a representative value (for example, a maximum value, a minimum value, a median value, and an average value) of the diameters in a plurality of directions intersecting the major axis of the pancreas need only be used as the diameter of the pancreas. The size of the pancreas can be calculated from the number of voxels in the region of the pancreas and the spacing between voxels in the medical image G0. The texture of the pancreas is a pixel value (CT value in a case of the CT image) of each pixel of the pancreas in the medical image G0.

The atrophy determination unit 27 determines that the pancreas has the atrophy in a case in which the evaluation value output by the discriminator 27A is equal to or more than a predetermined threshold value.

It should be noted that the discriminator 27A is not limited to the discriminator 27A that determines the presence or absence of the atrophy of the pancreas based on the feature of the pancreas. The discriminator 27A may be constructed to extract the feature of the pancreas from the medical image G0 and determine the presence or absence of the abnormality in the pancreas in a case in which the medical image G0 is input.

On the other hand, in a case in which the atrophy determination unit 27 determines that the pancreas has the atrophy, it is not known whether the atrophy is due to a pancreatic disease or due to the compression by the peripheral organs. Therefore, in the second embodiment, in a case in which the atrophy determination unit 27 determines that the pancreas has the atrophy, the compression determination unit 25 determines the presence or absence of the compression of the pancreas.

In a case in which the atrophy determination unit 27 determines that the pancreas has the atrophy and the compression determination unit 25 determines that the pancreas is compressed, because the atrophy of the pancreas is caused by the compression of the peripheral organs, the abnormality determination unit 28 determines that the pancreas has no abnormality. In a case in which the atrophy determination unit 27 determines that the pancreas has the atrophy and the compression determination unit 25 determines that the pancreas is not compressed, because the atrophy of the pancreas is caused by the pancreatic disease, the abnormality determination unit 28 determines that the pancreas has the abnormality. It should be noted that, in a case in which the atrophy determination unit 27 determines that the pancreas has no atrophy, the abnormality determination unit 28 determines that the pancreas has no abnormality.

Figure 11:
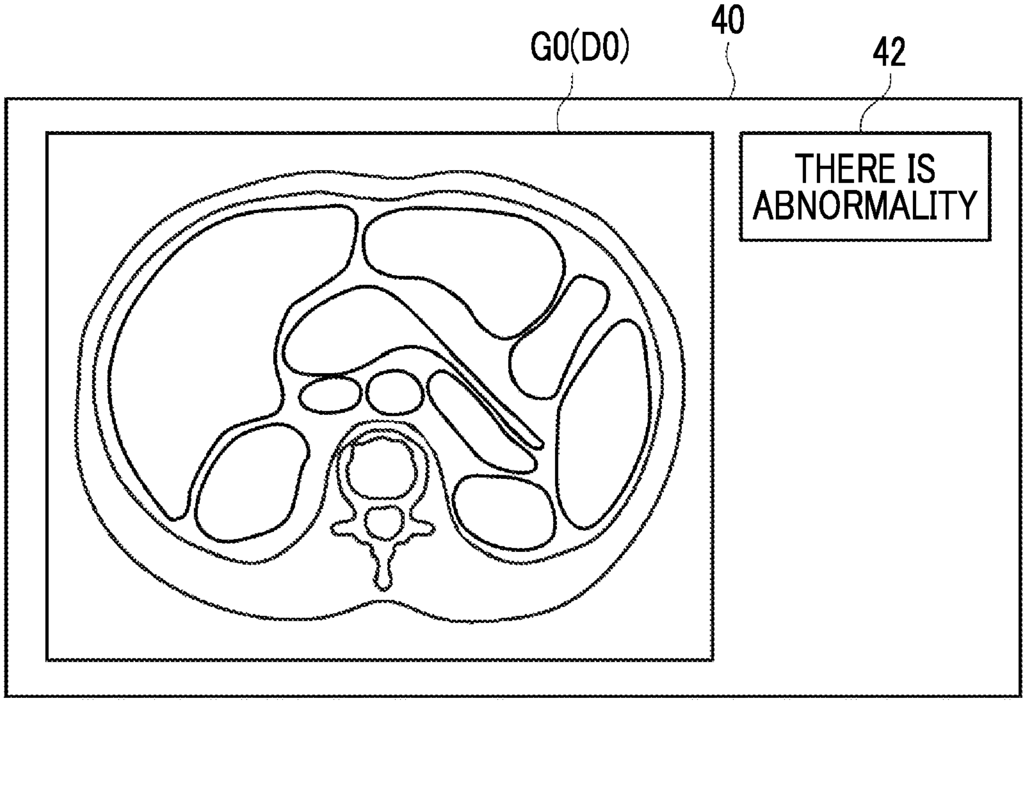
FIG. 11 is a diagram showing a display screen of a determination result of the presence or absence of an abnormality.

In the second embodiment, the display controller 26 displays a determination result by the abnormality determination unit 28 on the display 14. FIG. 11 is a diagram showing a display screen of the determination result in the second embodiment. As shown in FIG. 11, the medical image G0 in a case in which it is determined that there is the abnormality is displayed on the display screen 40. In addition, in the medical image G0 shown in FIG. 11, since the pancreas undergoes the atrophy but is not compressed by the peripheral organs, a determination result 42 indicating that there is the abnormality is displayed.

Figure 12:
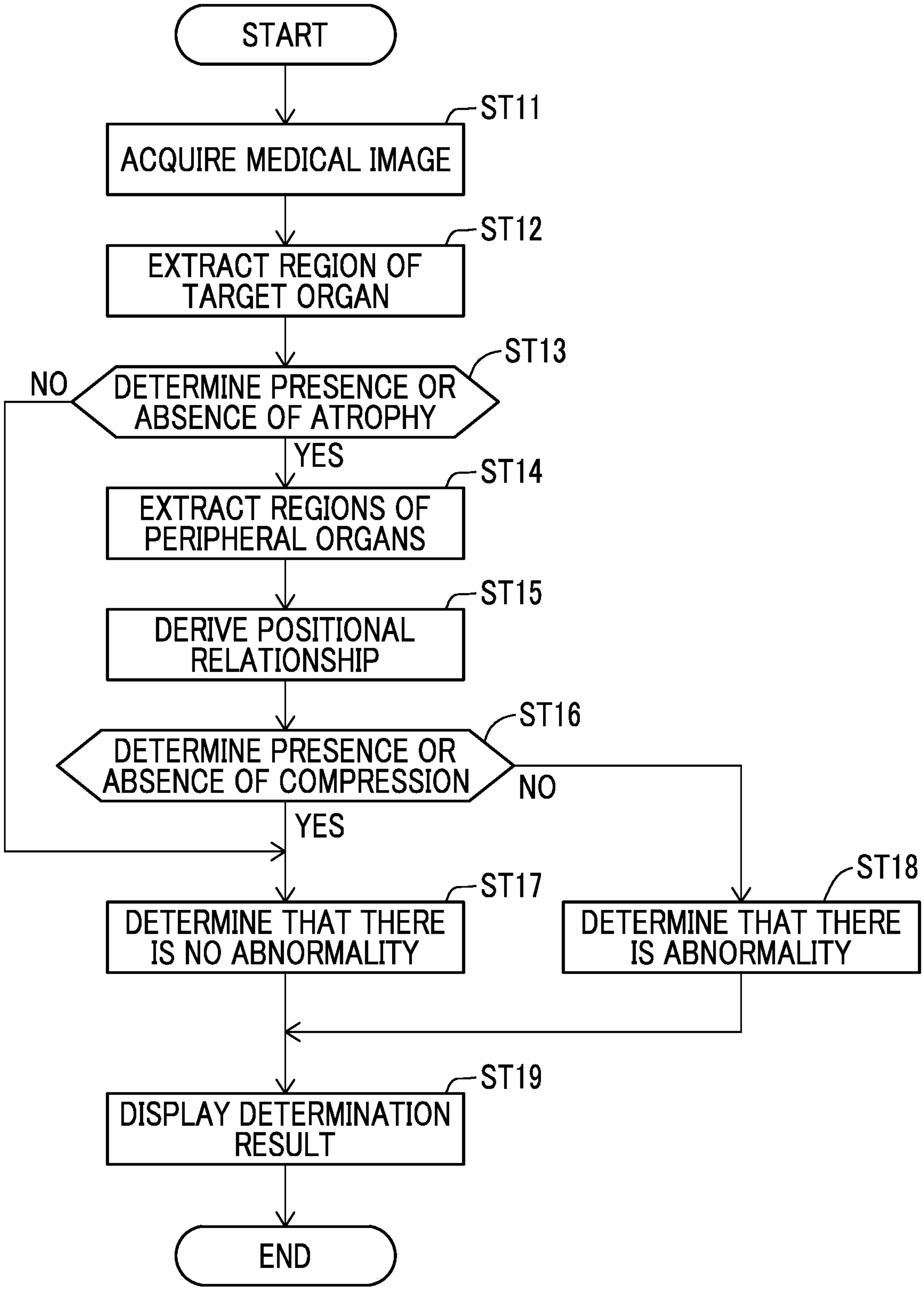
FIG. 12 is a flowchart showing processing performed in the second embodiment.

Hereinafter, processing performed in the second embodiment will be described. FIG. 12 is a flowchart showing the processing performed in the second embodiment. First, the image acquisition unit 21 acquires the medical image G0 from the storage 13 (step ST11), and the first extraction unit 22 extracts the region of the target organ from the medical image G0 (step ST12). Next, the atrophy determination unit 27 determines the presence or absence of the atrophy of the pancreas 30 that is the target organ (step ST13).

In a case in which it is determined that there is the atrophy (step ST13: YES), the second extraction unit 23 extracts the region of at least one peripheral organ in the periphery of the target organ (step ST14), and the positional relationship derivation unit 24 derives the positional relationship between the target organ and the peripheral organs (step ST15). Next, the compression determination unit 25 determines whether or not the target organ, that is, the pancreas 30 is compressed by the peripheral organs based on the positional relationship derived by the positional relationship derivation unit 24 (step ST16).

In a case in which it is determined that there is the compression (step ST16: YES), the abnormality determination unit 28 determines that the pancreas has no abnormality (step ST17). In a case in which it is determined that there is no compression (step ST16: NO), the abnormality determination unit 28 determines that the target organ has the abnormality (step ST18). On the other hand, in a case in which it is determined that the target organ has no atrophy (step ST13: NO), the processing proceeds to step ST17, and the abnormality determination unit 28 determines that the target organ has no abnormality. Then, the display controller 26 displays the determination result of the presence or absence of the abnormality of the target organ on the display 14 (step ST19), and terminates the processing.

As described above, in the second embodiment, the presence or absence of the atrophy of the target organ is determined, and the abnormality of the target organ is determined according to the presence or absence of the atrophy and the presence or absence of the compression of the target organ. Therefore, in a case in which the target organ undergoes the atrophy, it is possible to know whether the atrophy is due to the disease or due to the compression by the peripheral organs.

It should be noted that, in each of the embodiments described above, the medical image G0 may be used in addition to the positional relationship in a case of determining the presence or absence of the compression of the target organ. In this case, the discriminator 25A of the compression determination unit 25 is constructed by machine learning to output the evaluation value representing the presence or absence of the compression of the target organ in a case in which the medical image G0 is input in addition to the positional relationship.

Further, in each of the embodiments described above, the compression determination unit 25 determines the presence or absence of the compression of the target organ by using the discriminator 25A based on the positional relationship, but the present disclosure is not limited to this. In a case in which the positional relationship is the shortest distance between the contours of the target organ and the peripheral organ, in a case in which the representative value of the shortest distance between the target organ and at least one peripheral organ or the shortest distance between the target organ and all the peripheral organs is less than the predetermined threshold value, it may be determined that the target organ is compressed. An average value, a maximum value, a minimum value, a median value, or the like of the shortest distance between the target organ and all the peripheral organs can be used as the representative value.

In addition, in each of the embodiments described above, the positional relationship derivation unit 24 may derive a distance between a centroid of the target organ and a centroid of the peripheral organs as the positional relationship instead of the shortest distance between the contours of the target organ and the peripheral organs.

In addition, in each of the embodiments described above, the target organ is the pancreas, but the present disclosure is not limited to this. In addition to the pancreas, any organ, such as the brain, the heart, the lung, and the liver, can be used as the target organ.

In addition, in each of the embodiments described above, the CT image is used as the medical image G0, but the present disclosure is not limited to this. In addition to the three-dimensional image, such as the MRI image, any image, such as a radiation image acquired by simple imaging, can be used as the medical image G0.

In addition, in each of the embodiments described above, various processors shown below can be used as the hardware structure of the processing units that execute various types of processing, such as the image acquisition unit 21, the first extraction unit 22, the second extraction unit 23, the positional relationship derivation unit 24, the compression determination unit 25, the display controller 26, the atrophy determination unit 27, and the abnormality determination unit 28. As described above, the various processors include, in addition to the CPU that is a general-purpose processor which executes software (program) to function as various processing units, a programmable logic device (PLD) that is a processor of which a circuit configuration can be changed after manufacture, such as a field programmable gate array (FPGA), and a dedicated electrical circuit that is a processor having a circuit configuration which is designed for exclusive use to execute a specific processing, such as an application specific integrated circuit (ASIC).

One processing unit may be configured by one of these various processors or may be configured by a combination of two or more processors of the same type or different types (for example, a combination of a plurality of FPGAs or a combination of the CPU and the FPGA). In addition, a plurality of the processing units may be configured by one processor.

As an example of configuring the plurality of processing units by one processor, first, as represented by a computer of a client, a server, and the like there is an aspect in which one processor is configured by a combination of one or more CPUs and software and this processor functions as a plurality of processing units. Second, as represented by a system on chip (SoC) or the like, there is an aspect of using a processor that realizes the function of the entire system including the plurality of processing units by one integrated circuit (IC) chip. In this way, as the hardware structure, the various processing units are configured by using one or more of the various processors described above.

Further, as the hardware structures of these various processors, more specifically, it is possible to use an electrical circuit (circuitry) in which circuit elements, such as semiconductor elements, are combined.

What is claimed is:

1. An image processing apparatus comprising:

at least one processor, wherein the processor extracts a region of a target organ from a medical image, extracts at least one feature of the target organ from the region of the target organ, wherein the at least one feature includes at least one of a diameter, a size, or a texture of the target organ, wherein the diameter of the target organ is determined based on a cross section intersecting a major axis of the target organ, wherein the size of the target organ is determined based on a number of voxels in the region of the target organ and a spacing between voxels in the medical image, and wherein the texture of the target organ is determined based on a pixel value of each pixel of the target organ, determines presence or absence of atrophy of the target organ based on the at least one feature of the target organ, in response to the absence of the atrophy of the target organ, determines that the target organ has no abnormality, in response to the presence of the atrophy of the target organ, extracts a region of at least one peripheral organ that is present in a periphery of the target organ from the medical image, derives a positional relationship between the target organ and the peripheral organ, and determines whether or not the target organ is compressed by the peripheral organ based on the positional relationship, in response to the target organ being compressed by the peripheral organ, determines that the target organ has no abnormality;

in response to the target organ not being compressed by the peripheral organ, determines that the target organ has the abnormality; and displays a determination result on whether the target organ has the abnormality or not.

2. An image processing method comprising:

extracting a region of a target organ from a medical image;

extracting at least one feature of the target organ from the region of the target organ, wherein the at least one feature includes at least one of a diameter, a size, or a texture of the target organ, wherein the diameter of the target organ is determined based on a cross section intersecting a major axis of the target organ, wherein the size of the target organ is determined based on a number of voxels in the region of the target organ and a spacing between voxels in the medical image, and wherein the texture of the target organ is determined based on a pixel value of each pixel of the target organ;

determining presence or absence of atrophy of the target organ based on the at least one feature of the target organ;

in response to the absence of the atrophy of the target organ, determining that the target organ has no abnormality;

in response to the presence of the atrophy of the target organ, extracting a region of at least one peripheral organ that is present in a periphery of the target organ from the medical image, deriving a positional relationship between the target organ and the peripheral organ, and determining whether or not the target organ is compressed by the peripheral organ based on the positional relationship;

in response to the target organ being compressed by the peripheral organ, determining that the target organ has no abnormality;

in response to the target organ not being compressed by the peripheral organ, determining that the target organ has the abnormality; and displaying a determination result on whether the target organ has the abnormality or not.

3. A non-transitory computer-readable storage medium that stores an image processing program causing a computer to execute:

extracting a region of a target organ from a medical image;

extracting at least one feature of the target organ from the region of the target organ, wherein the at least one feature includes at least one of a diameter, a size, or a texture of the target organ, wherein the diameter of the target organ is determined based on a cross section intersecting a major axis of the target organ, wherein the size of the target organ is determined based on a number of voxels in the region of the target organ and a spacing between voxels in the medical image, and wherein the texture of the target organ is determined based on a pixel value of each pixel of the target organ;

determining presence or absence of atrophy of the target organ based on the at least one feature of the target organ;

in response to the absence of the atrophy of the target organ, determining that the target organ has no abnormality;

in response to the presence of the atrophy of the target organ, extracting a region of at least one peripheral organ that is present in a periphery of the target organ from the medical image, deriving a positional relationship between the target organ and the peripheral organ, and determining whether or not the target organ is compressed by the peripheral organ based on the positional relationship;

in response to the target organ being compressed by the peripheral organ, determining that the target organ has no abnormality;

in response to the target organ not being compressed by the peripheral organ, determining that the target organ has the abnormality; and displaying a determination result on whether the target organ has the abnormality or not.

* * * * *